April 20, 1965

G. ALFIERI ETAL 3,179,474

MULTIPLE CONTROL VALVE HAVING ITS INDIVIDUAL VALVES SET
FOR OPENING AT DIFFERENT PREDETERMINED PRESSURES

Filed March 23, 1962

INVENTORS
Giuseppe Alfieri
Roberto Moriondo

BY Watson, Cole, Grindle & Watson

INVENTOR.
Giuseppe Alfieri
Roberto Moriondo
BY
Watson, Cole, Grindle & Watson

United States Patent Office 3,179,474
Patented Apr. 20, 1965

3,179,474
MULTIPLE CONTROL VALVE HAVING ITS INDIVIDUAL VALVES SET FOR OPENING AT DIFFERENT PREDETERMINED PRESSURES
Giuseppe Alfieri and Roberto Moriondo, Milan, Italy, assignors to Fabbrica Italiana Magneti Marelli S.p.A., Milan, Italy
Filed Mar. 23, 1962, Ser. No. 181,855
Claims priority, application Italy, Mar. 27, 1961, 5,511/61
2 Claims. (Cl. 303—52)

The present invention relates to a multiple pneumatic distributor with inlet and discharge valves operating in accordance with a pre-established opening sequence particularly suited for the braking equipment of motor vehicles.

It is known that in the multiple pneumatic distributors, the opening of the inlet and discharge valves according to pre-established sequences are obtained by suitably setting the controls or by inserting in the single distributor a sections of the distributor additional loading springs having adequate stress and elasticity, or by mounting adjustment springs having different characteristics for restoring the piston and inlet valves.

For the particular exigencies of use especially in the braking installations of vehicles with trailers, the pneumatic distributors must possess well defined characteristics of their own which cannot be varied without relatively laborious transformations.

The object of the present invention is to provide a multiple distributor which, besides allowing a perfect transformability of the features concerning the advances and lags of intervention between the various sections, makes it possible to effect said transformations with extremely simple operations and a minimum of expense.

The object of the invention is substantially characterized by the fact that the seats of the inlet and/or discharge valves are, at least in part, of different dimensions, so as to realize different values of pneumatic pressure upon the valve and therefore, the desired inlet and/or discharge sequence, which control is obtained through elastic means acting simultaneously upon the different sections.

The invention will be described with reference to the attached schematic drawings given by way of example only and the drawing is not to be construed as limiting the range of the invention.

Figure 1:
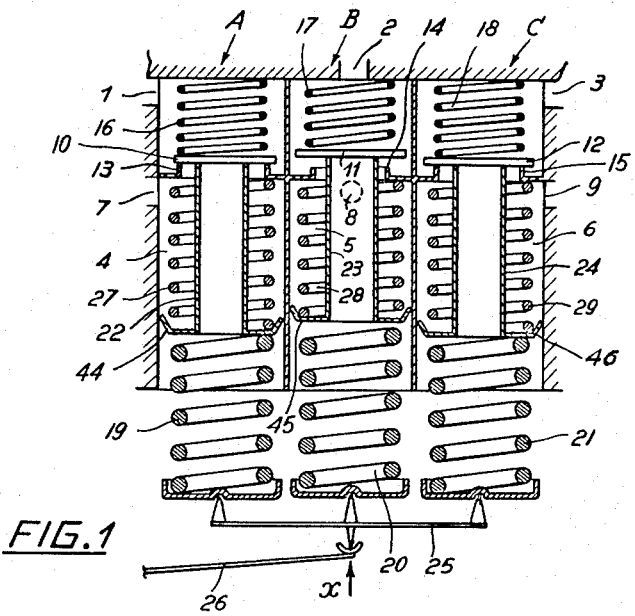
FIG. 1 shows a section view of a pneumatic distributor composed of three sections with balanced control on two sections and provision for the advanced opening of the inlet valve of the third section.

With reference to FIG. 1, designations A, B and C indicate the three sections of the multiple pneumatic distributor.

The compressed air reaches the upper chambers of the three sections A, B and C through the conduits 1, 2 and 3 (protected in a known way by check valves not illustrated). Between each of the said valves and the respective feeding chambers of the operation cylinders 4, 5 and 6 (not illustrated) and connected to the conduits 7, 8 and 9 are arranged in a known manner the inlet valves 10, 11 and 12 which sealingly cooperate with the seats 13, 14 and 15 and are influenced in the direction of closure by the springs 16, 17 and 18. The opening of the inlet valves 10, 11 and 12 is obtained through the adjusting springs 19, 20 and 21 with the hollow pushers 22, 23, 24 contacting pistons 44, 45, 46 by actuation of rocker 25 by the lever 26 controlled by the driver. The pushers 22, 23, 24 are in turn subjected to the force of the return springs 27, 28 and 29. When valves (10, 11, 12) close they put the chambers 4, 5 and 6 in communication with the outside through their axial hole.

At the time when particular control exigencies require it, the inlet and/or discharge of the air into/or from the operator cylinders under the control of the distributor sections can be made according to a definite sequence. This result is obtained as far as the inlet valve openings are concerned, in the example illustrated in FIG. 1, by means of a different dimensioning from the seal seats 13, 14 and 15 of the valves themselves. In particular, in FIG. 1 the seat 14 of the center valve has a reduced diameter in respect to the diameter of the valves 13 and 15. Therefore, if the springs governing the movements are equal in the three sections, by displacing the rocker 20 in the direction of the arrow X, an opening force is exerted on the valves 10, 11 and 12 which is equal for the three sections. On the other hand, the pneumatic pressure which opposes the opening of center valve 11 because of the reduced dimensions of the seat 14, is lower than the pneumatic thrust upon the lateral shutters 10 and 12 and therefore, the inlet valve of the center section B will open in advance of the lateral ones A and C (it opens, in fact, as soon as the load on the spring 20 has attained the value of the opposing load constituted by the pneumatic pressure upon shutter 11 and by the load of the two springs 28 and 17).

Figure 2:
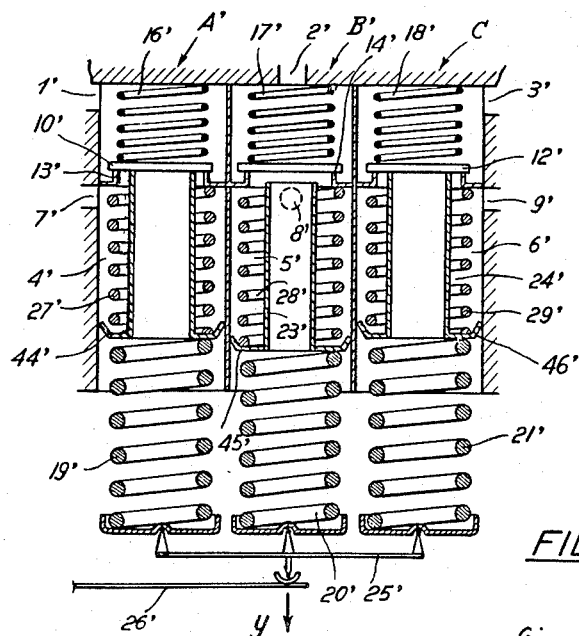
FIG. 2 is a section view of an analogous representation of a three section distributor with structure for producing advanced opening of the discharge valve of one section.

In the example of FIG. 2, wherein the parts corresponding to those of FIG. 1 are designated by prime numbers, pushers 22′, 23′, 24′, are provided which have different characteristics from one another. The two side pushers 22′ and 24′ have a diameter on their upper end which defines the closure seat of the discharge valve in cooperation with the respective inlet shutter, an effective area larger than the upper extremity (sealing seat) of the center pusher 23′. Therefore, when the rocker 25′ is displaced in the direction of the arrow Y for discharging the operating cylinders, there is an advance of the opening of the center section B′ in that the pneumatic pressure acting upon the pusher 23′ (a pressure which is a function of the area outside the end upper seat of the pusher itself) against the spring 20′ is greater than the pneumatic pressure acting on the lateral pushers 22′ and 24′ which have an external area of a lower value on their upper end seats. The desired succession is therefore obtained in the opening of the discharge valves of the three sections.

Figure 3:
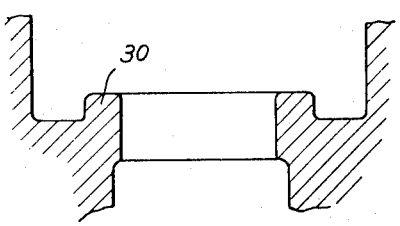
FIG. 3 shows in section a constructional detail on an enlarged scale of the inlet shutter seat, before being subjected to mechanical working.
Figure 4:
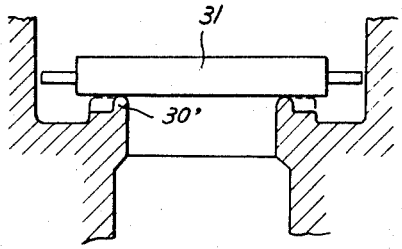
FIGS. 4, 5 and 6 are similar representations of three different seats for the inlet valve obtained by mechanical working of the rough seat illustrated in FIG. 3.
Figure 5:
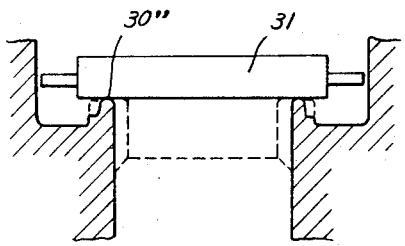
Figure 6:
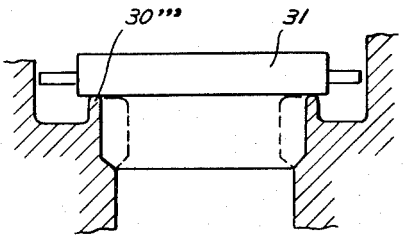

In view of the above explained concepts it is evident that, with a minimum of transformations, a particular multiple distributor can be easily adapted to the sequence exigencies of the opening of the inlet and/or discharge valves every time this is required. According to the representation of FIG. 3, the seat 30 for the inlet valve may be formed with a suitable radical thickness so as to allow machining, for instance, of three different seat dimensions, as shown in FIG. 4 (smaller seat 30′), in FIG. 5 (intermediate seat 30″) and in FIG. 6 (larger seat 30‴). In FIGS. 4, 5 and 6 the rough pieces are represented by dash lines, with the extra working metal as in FIG. 2 and with the respective shutter of the inlet valve.

It is to be understood that the same embodiment can be provided for the tubular pusher, leaving sufficient extra metal to permit mechanical working of the seat and to permit the use of pushers having various diameters.

Figure 7:
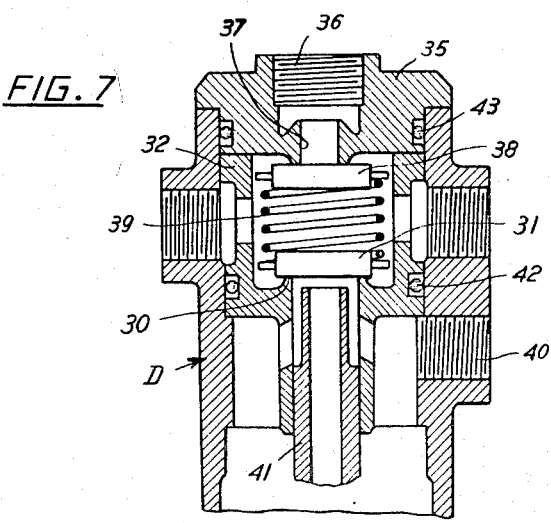
FIG. 7 represents in section the constructional detail of a section of a multiple distributor with a changeable valve body.

In FIG. 7, on the other hand, is represented a detailed view of a multiple distribution section in which the seat of the inlet valve is interchangeable, so that the seat of the desired diameter for obtaining the desired sequence of opening can be inserted.

The distributor body D has a cylindrical seat for the cylindrical element 32 which carries the seat 30 for the inlet valve 31. The cover 35 holds the element 32 in place and has the inlet 36 for feeding the compressed air and the seat 37 for the check valve 38. Between the two valves 31 and 38 is arranged the opposing closure spring 39. In the same FIG. 7, numeral 40 indicates the outlet for the connection with the operating cylinder and numeral 41 is the hollow pusher for the opening of the inlet valve.

The element 32 carries an annular gasket 42 defining a seal between the compressed air inlet chamber and the opposite side of valve 34. The cover 35 has in turn an annular gasket 43 separating the inlet air from the exterior.

It is to be understood that the details of the distributor may also be varied from the described and illustrated ones without departing from the spirit and scope of the invention.

I claim:

1. A multiple pneumatic distributor for sequentially controlling a series of events such as the operation of braking equipment in motor vehicles, comprising in combination, pneumatic input conduit means, three pneumatic output conduits, means establishing individual conduit passages between respective ones of said output conduits, and said input conduit means, controllable valves in each of said passages each comprising a valve shutter plate fitting in sealing relationship with a valve seat having a predetermined dimension and a hollow pusher rod with one end seated against said valve plate and leading to a source of pneumatic reference pressure external to said passages, wherein the three valve seats have different dimensions and the three hollow pusher rods have the same dimensions at the end seated against the valve plate, said valves being normally biased in closed position, three similar valve opening springs for moving corresponding ones of said pusher rods against the valve plates to position the valves into an opening condition, and rocker means simultaneously applying equal force to the plurality of valve opening springs so that each of the plurality of valves opens a corresponding one of the passages in sequence as the force applied exceeds the opening force of the corresponding valve.

2. A multiple pneumatic distributor for sequentially controlling a series of events such as the operation of braking equipment in motor vehicles, comprising in combination, pneumatic input conduit means, three pneumatic output conduits, means establishing individual passages between respective ones of said output conduits and said input conduit means, controllable valves in each of said passages each comprising a valve shutter plate fitting in sealing relationship with each valve seat and wherein the valve seats all have the same dimension and a hollow pusher rod with one end seated against said valve plate and leading to a source of pneumatic reference pressure external to said passages, wherein the pusher rods have different dimensions at the end seated against the valve plate, said valves being normally biased in closed position, three similar valve opening springs for moving corresponding ones of said pusher rods against the valve plates to position the valves in an opened condition, and rocker means simultaneously applying equal force to the plurality of valve opening springs so that each of the plurality of rods opens a path between said passages and said reference pressure source in sequence as the force is removed from said valves by said rocker means.

References Cited by the Examiner

UNITED STATES PATENTS

| 2,081,699 | 5/37 | Farmer et al. | 303—6 |
| 2,366,192 | 1/45 | Johnson | 303—6 |
| 2,826,215 | 3/58 | Wolfslau et al. | 137—454.6 |

FOREIGN PATENTS

| 1,193,954 | 5/59 | France. |
| 1,232,077 | 4/60 | France. |
| 1,247,817 | 10/60 | France. |
| 882,382 | 11/61 | Great Britain. |

EUGENE G. BOTZ, *Primary Examiner.*

KENNETH J. ALBRECHT, ARTHUR L. LA POINT, *Examiners.*